United States Patent [19]
Chang

[11] Patent Number: 5,545,560
[45] Date of Patent: Aug. 13, 1996

[54] APPARATUS FOR COMPOSTING AND TREATING WASTE, PARTICULARLY DUNG

[76] Inventor: Dao-Pin Chang, 55, Hou Hu, Hu Pei Tsun, Lin Kou Ksiang, Taipei Hsien, Taiwan

[21] Appl. No.: 566,594

[22] Filed: Dec. 4, 1995

Related U.S. Application Data

[63] Continuation of Ser. No. 141,595, Oct. 27, 1993, abandoned.

[30] Foreign Application Priority Data

Jun. 15, 1993 [DK] Denmark .................................. 0712/93

[51] Int. Cl.⁶ .............................. B01D 33/04; C02F 3/08; C12M 1/02; C12M 1/10
[52] U.S. Cl. ........................ 435/290.2; 210/290; 210/297; 210/400; 210/413; 210/783; 210/807; 435/290.1; 435/290.3; 435/290.4; 435/297.1
[58] Field of Search .................................. 71/12, 13, 15, 71/21, 22; 210/290, 297, 400, 413, 415, 489, 527, 783, 807; 435/268, 290.1, 290.2, 290.3, 290.4, 297.1

[56] References Cited

U.S. PATENT DOCUMENTS

| | | | |
|---|---|---|---|
| 1,123,414 | 1/1915 | Smith ............................................. | 71/13 |
| 2,173,256 | 9/1939 | Jordan ....................................... | 210/783 |
| 3,778,233 | 12/1973 | Blough et al. ........................... | 435/315 |
| 4,137,062 | 1/1979 | Mullerheim et al. ........................ | 71/9 |
| 4,419,239 | 12/1983 | Frankel ...................................... | 210/413 |
| 5,207,904 | 5/1993 | Abel ........................................... | 210/252 |
| 5,368,732 | 11/1994 | Pierson ...................................... | 210/386 |
| 5,405,780 | 4/1995 | Hamilton, Jr. .......................... | 435/315 |

FOREIGN PATENT DOCUMENTS

| | | | |
|---|---|---|---|
| 2320922 | 3/1977 | France . | |
| 2416158 | 10/1975 | Germany ................................. | 210/527 |
| 2900276 | 7/1980 | Germany ................................. | 210/527 |
| 73307 | 6/1980 | Japan ....................................... | 210/400 |
| 210588 | 10/1985 | Japan ....................................... | 435/316 |
| 2192662 | 1/1988 | United Kingdom ................... | 435/316 |
| 2257640 | 1/1993 | United Kingdom ................... | 210/783 |
| 18611 | 10/1992 | WIPO ...................................... | 435/311 |

*Primary Examiner*—Jeffrey E. Russel
*Attorney, Agent, or Firm*—Wenderoth, Lind & Ponack

[57] ABSTRACT

The apparatus transforms animal waste produced during husbandry activities into useful materials such as organic-based manure and/or fertilizer to thereby mitigate the pollution problems associated with husbandry activities. A base part of the apparatus includes an endless conveyor having a filter in the form of an endless loop. A liquid-collection receptacle is interposed between the upper and lower runs of the filter so as to collect liquid filtrate from the waste material. A first hopper is located beneath one end of the endless loop so as to collect the solid content of the waste conveyed along the upper run of the filter. A second hopper is provided to accommodate material to be added to the solid content of the waste. The materials are fed from the respective hoppers into a mixing chamber whereupon they are mixed by a mixer. The base part of the apparatus is connected to a closed system of treatment tanks. The tank for treating the liquid content of the waste material accommodates a filtration layer at the bottom of the tank, a motor-driven carriage, and stirring bars extending from the motor-driven carriage toward the filtration layer. Soil is added into the tank and the tank is closed. The liquid content of the waste is introduced into the tank and when the motor-driven carriage is actuated, the stirring bars are rotated and moved across the tank to mix the liquid content of the waste with the soil to thereby produce high quality fertilizer.

18 Claims, 8 Drawing Sheets

APPARATUS FOR COMPOSTING AND TREATING WASTE, PARTICULARLY DUNG

This application is a Continuation of now abandoned application Ser. No. 08/141,595, filed Oct. 27, 1993.

BACKGROUND OF THE INVENTION

The present invention relates to apparatus for composting waste material having solid and liquid contents, and in particularly for composting the dung of farm animals.

In many countries and localities, husbandry activities are carried out without concern for the environment. However, in recent years, due to the protective measures now instituted for the environment, limits on animal husbandry have been imposed. Of course, an ideal solution to the conflict between animal husbandry and the environment would not sacrifice the growth in animal husbandry activities for the sake of the environment or vice versa. That is, an ideal solution would address both concerns simultaneously.

In conventional hog farms, hog excretion is collected in a pond and allowed to decompose until it is useful as a fertilizer. The decomposition process results in noxious odors and the pond proves to be a significant breeding ground for insects and mosquitoes. The so-called dung pond is, therefore, quite unsanitary. Even worse, some hog farmers directly discharge the excretion of the hogs directly into a river. This creates serious detrimental effects on the environment. In this case, local authorities must place restrictions on the number of hogs allowed per farm and must also take anti-pollution countermeasures. Other localities restrict hog husbandry activities to areas where there is less concern regarding environmental pollution. None of these measures satisfactorily address the above-mentioned conflict between animal husbandry activities and the growing concern for the environment.

SUMMARY OF THE INVENTION

An object of the present invention is to solve the above-described problems by providing apparatus which converts the excretion of hogs into valuable organic manure and/or natural fertilizer which can replace chemical fertilizers. The apparatus includes a base unit which not only separates the solid and the liquid contents of the animal waste but also facilitates the composting of the separated solid contents, e.g. the mixing of the solid contents of the waste with suitable additional materials for making high quality organic manure. Both the filtered liquid contents and the mixed solid contents may be further processed in respective waste treatment tanks. The basic apparatus is characterized in that it includes an endless conveyor in which the belt of the conveyor is a filter of flexible mesh material. The waste is introduced onto the upper run of the circulating filter via a U-shaped chute. A cover is disposed over an intermediate portion of the upper run of the filter, and a blower and an absorber are located within the cover. The blower directs an air stream onto the waste material conveyed beneath the cover. This air stream compresses the waste material against the filter. Although a majority of the liquid content of the waste material passes through the filter, the action of the blower creates bubbles at the surface of the waste material. This liquid is effectively removed by the absorber. A liquid-collection receptacle is interposed between the upper and the lower runs of the filter so as to collect the liquid filtrate from the waste material.

The remaining solid content of the waste material is conveyed by the filter and dumped into a first hopper located beneath an end of the filter, i.e. at a transition between the upper and the lower runs of the filter.

A second hopper is provided for accommodating material to be added to the solid content of the waste, this added material being selected as desired to produce suitable manure.

The hoppers communicate with a mixing chamber in which a mixer is disposed. The mixer mixes the materials received in the mixing chamber from the first and second hoppers.

The collected liquid contents of the waste material and the materials mixed in the mixing chamber can then each be sent to respective waste treatment tanks. The waste treatment tank for the liquid contents includes at least one tank body, a motor driven carriage disposed in each tank body, a plurality of rotating stirring bars supported by the motor-driven carriage, and a guide which guides the motor-driven carriage between opposite ends of the tank body. A filtration layer of coarse aggregate, a filtration net disposed over the aggregate, a fine aggregate, and a second filtration net disposed over the fine aggregate, is disposed at the bottom of the tank body. Earthen materials are introduced into the tank body, and the motor-driven carriage is reciprocated across the tank body such that the liquid contents of the waste material are mixed with the earthen materials by the stirring bars supported by the motor-driven carriage. The resulting mixture provides an organic fertilizer. Any excess liquid is filtered by the filtration layer disposed at the bottom of the tank body.

The waste treatment tank for the mixture, including the solid content of the animal waste material formed, in the base unit is substantially the same as that described above with the exception of the filtration layer. In this tank, the dry materials are essentially mashed, fermented and sterilized to produce a high quality organic manure.

DETAILED DESCRIPTION OF THE PREFERRED EMBODIMENT

Figure 1A:
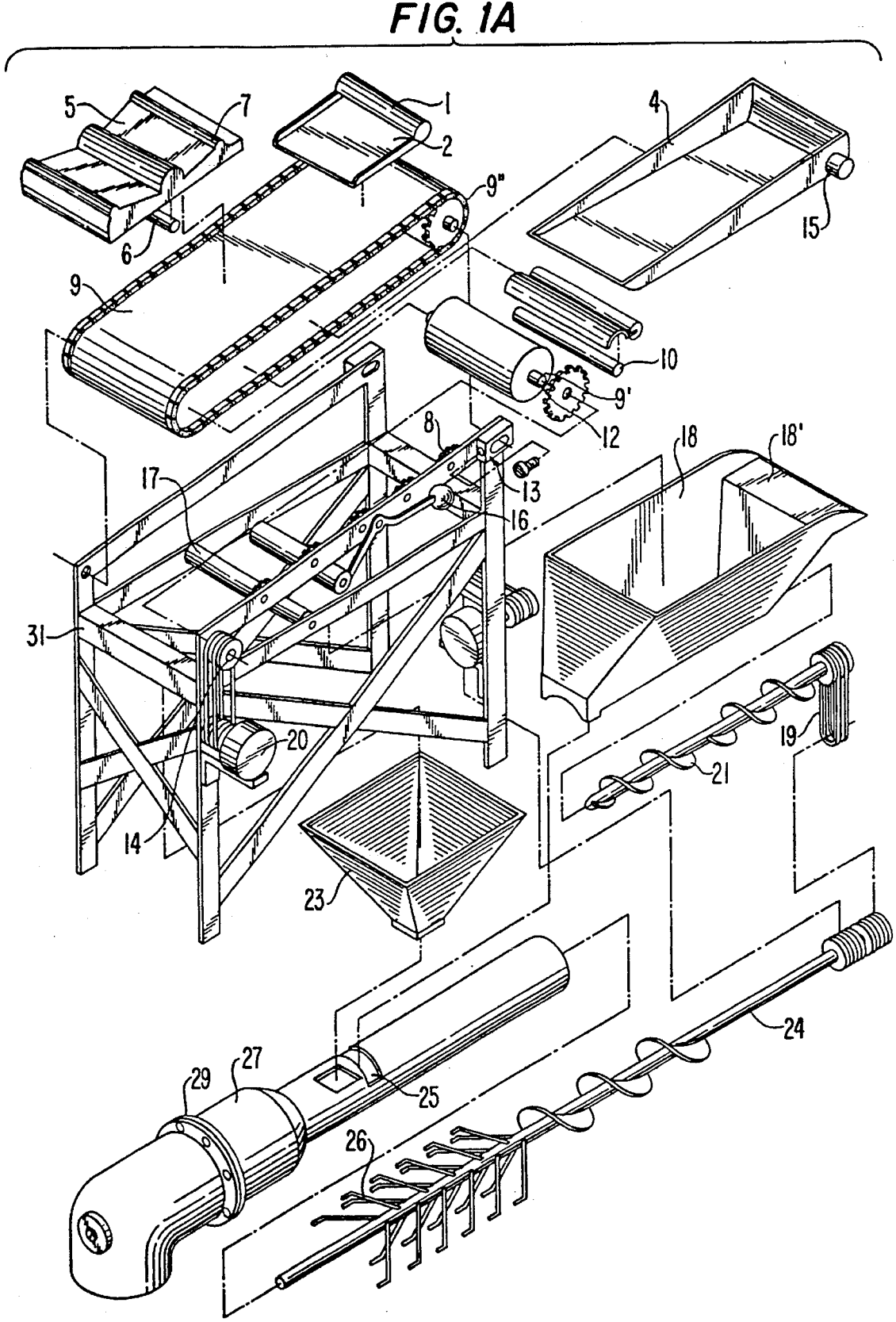
FIG. 1A is an exploded view of apparatus for filtering and composting waste according to the present invention.

First, the base apparatus for filtering the animal excrement will be described with reference to FIGS. 1A–4.

Reference numeral 1 designates an inlet end of a rectangular U-shaped chute 2 from which animal excrement 3 is introduced to an endless conveyor described below. Typically, the inlet end 1 will constitute the outlet of a drainage system which receives the excrement which drains down to the system according to the contour of the land on which the apparatus is set up.

Reference numeral 31 designates a metal framework supporting the endless conveyor. The endless conveyor includes a filter 9 of flexible cloth in the form of an endless loop having upper and lower runs. The filter has 75 openings per linear inch (a mesh of 0.32 mm) whereby it can filter over 90% of the liquid content of typical hog excrement. The filter 9 is wrapped around drive and idle rollers 9', the drive roller being located at the left-hand end of the conveyor shown in FIG. 3 and the idle roller being at the right-hand end. A pair of ropes 9" each in the form of an endless loop are located to respective sides of the filter 9. A series of connectors 9a connect each of the ropes to the filter. A plurality of toothed wheels 8 are rotatably supported by the framework between the filter 9 and each of the ropes 9". These toothed wheels 8 engage the series of connectors 9a connecting the ropes 9" to the filter 9 in order to spread the filter 9 and maintain the filter 9 in such a spread condition. The drive and idle rollers 9' also have toothed portions at their axial ends, respectively, engaging the series of connectors 9a.

Figure 1B:
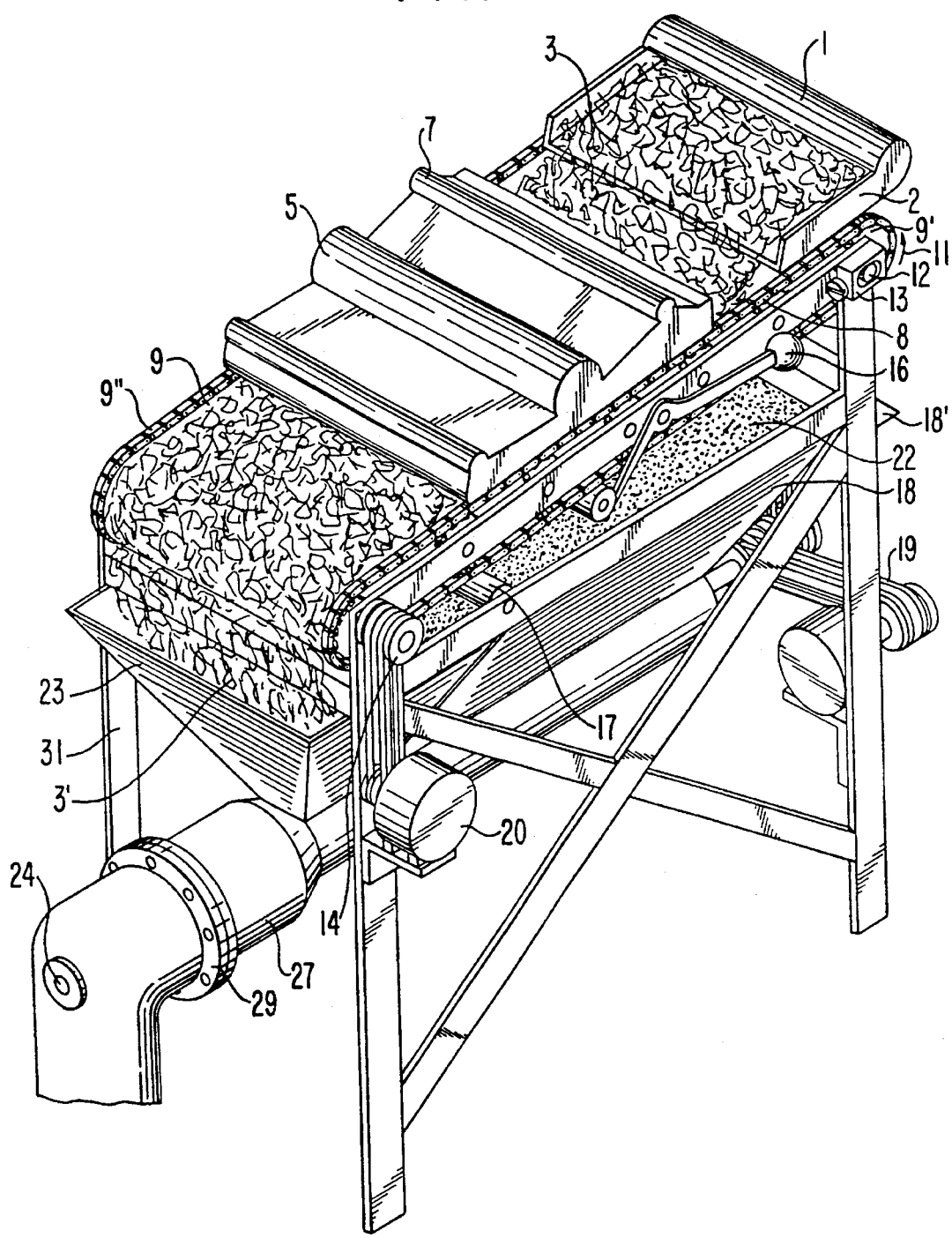
FIG. 1B is a perspective view of the apparatus.

A cover 5 is disposed over and covers an intermediate portion of the upper run of the filter 9. A blower 6 (FIG. 3) is located within the cover above the upper run of the filter 9 so as to direct an air stream onto the animal excrement 3 (waste material) conveyed along the upper rung of the filter 9. This air stream spreads out the animal excrement 3 and facilitates the filtration of the animal excrement 3 with the filter 9. By compressing the animal excrement 3, the air stream from the blower 6 invariably causes water bubbles (liquid) to form at the upper surface of the animal excrement. To cope with this, suitable absorbers 7 are provided within the cover 5, at opposite ends thereof as shown in FIG. 1B, in order to absorb the liquid at the upper surface of the waste material. Various known absorbents/absorbing devices lend themself for use as the absorbers 7. The only constraint on the absorber 7 is that it not absorb (for example, suction) the mostly solid layer of waste atop which the water bubbles are formed.

Under the action of the animal excrement 3 falling on the filter from the chute 2, and the air stream directed against the animal excrement 3 by the blower 6 when the excrement is conveyed beneath the cover 5, the liquid content of the excrement passes through the filter 9 where it is collected by a liquid-collection receptacle 4 interposed between the upper and lower runs of the filter 9. The liquid filtrate from the waste material conveyed along the upper run of the filter 9 best drips into the liquid-collection receptacle 4 leaving the solid content of the waste material on the upper run of the filter 9.

This remaining solid content of the waste material, designated by reference 3', is conveyed in the direction of arrow 11 into a first hopper 23 located beneath an end of the endless loop of the filter 9 (FIG. 3) at a transition between the upper and the lower runs of the filter 9. The first hopper 23 thus collects the solid content of the waste material conveyed along the upper run of the filter 9.

Any material still clinging to the filter 9 is blown off of the filter 9 by another blower 10 which is located between the upper and lower runs of the filter 9 directly above the first hopper 23. That is, the blower 10 directs an air stream onto the lower run of filter 9 so as to clean the lower run. The blower 10 extends over the entire width of the filter 9. A pair of rolls 17, 17 are provided adjacent the blower 10 with the lower run of the filter 9 located between the rolls 17, 17. The purpose of these rolls 17, 17 is to retain the lower run of the filter 9 at a position close to the blower 10 to ensure adequate cleaning of the filter 9. Although the rolls 17, 17 are shown as rotatably supported about fixed axes of rotation, the rolls 17, 17 could be made to be vertically movable so that the position of the lower run of the filter 9 could be adjusted relative to the blower 10. In addition, up and down movement of the rolls 17, 17 could be used to shake the filter 9 and aid in the cleaning process.

The filter 9 is driven by a motor 20 via belts engaged with a pulley 14 mounted to a shaft 12 integral and coaxial with the drive roller 9'.

A tension maintaining device is provided to maintain tension on the filter 9 while it is driven by the motor 20. The tension maintaining device includes an arm 16 pivotably mounted to the framework 31 at a location intermediate opposite ends of the arm 16. A roller is supported on one end of the arm 16 (left end in FIG. 3) in contact with the lower run of the filter 9. A weight is mounted to the other end of the arm 16 and biases the roller against the lower run of the filter.

Figure 2:
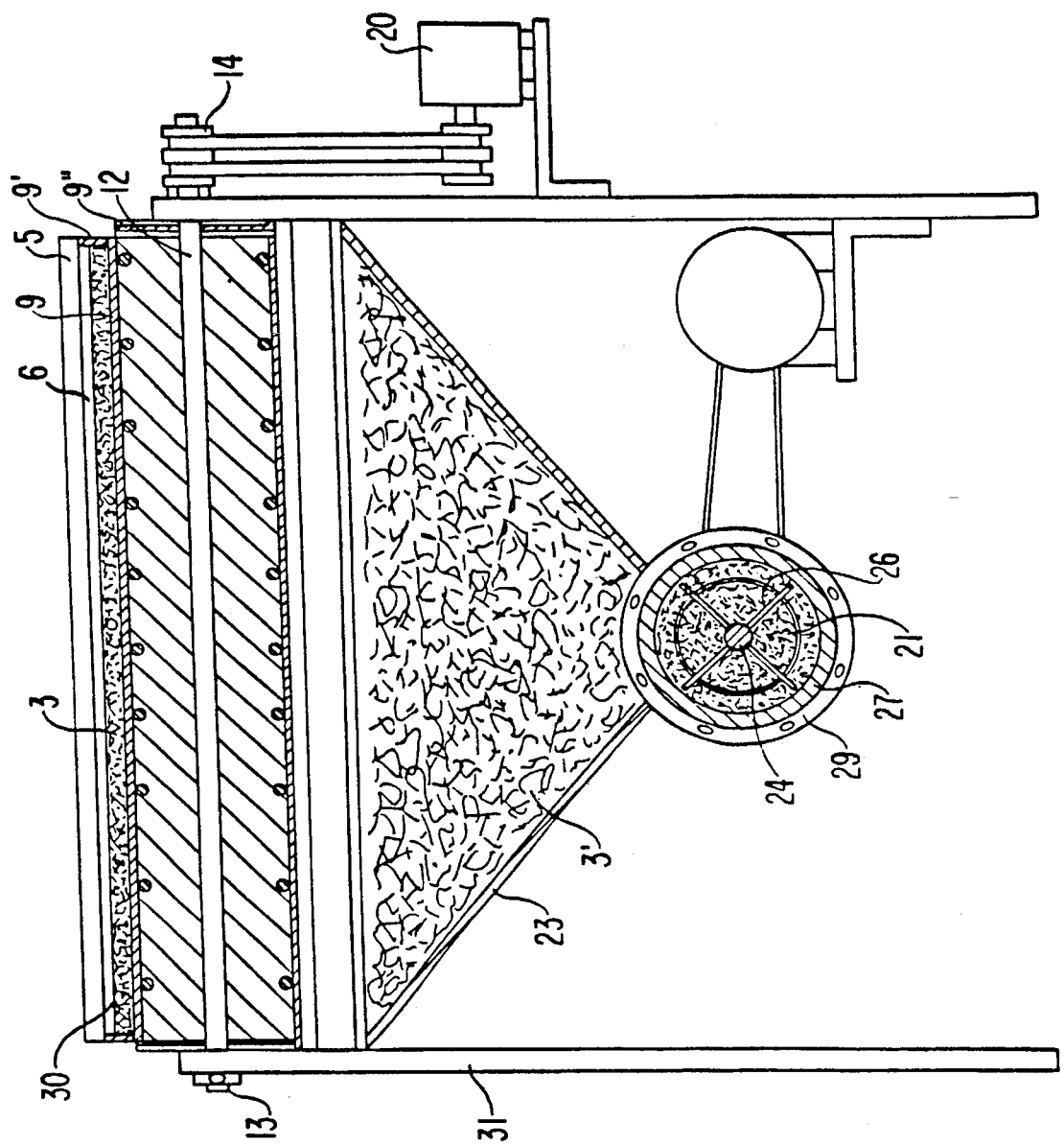
FIG. 2 is a cross-sectional view of the apparatus.

On the other hand, the tension of the filter 9 of flexible material can be adjusted by a tension adjusting device associated with the idle roller 9'. The tension adjusting device includes a housing 13 rotatably supporting the idle roller 9' (although it would be possible to use the tension adjusting device in conjunction with the drive roller). A screw can be turned to adjust the position of the shaft 12 fitted in an elongate slot of the housing 13. This shaft 12 is integral and coaxial with the idle roller 9'. By turning the screw, the position of the idle roller 9' relative to the housing 13 is changed, i.e. the position of the rotational axis of the idle roller 9' is changed, whereby the tension of the filter wrapped around the drive and idle rollers can be adjusted. As seen in FIG. 2, a similar tension adjusting device is provided at the other side of the conveyor as well.

At this point, it should be clear that the animal excrement 3, or other waste material, is filtered by filter 9 with the liquid content of the waste material being collected in the liquid-collection receptacle 4 and the solid content 3' of the waste being collected in the first hopper 23. The liquid content of the waste in receptacle 4 passes therefrom through piping 15 (FIG. 4) to be further processed as will be described later on. On the other hand, the solid content 3' of the waste is mixed with other materials, such as dry dung, in forming an organic based manure.

Figure 3:
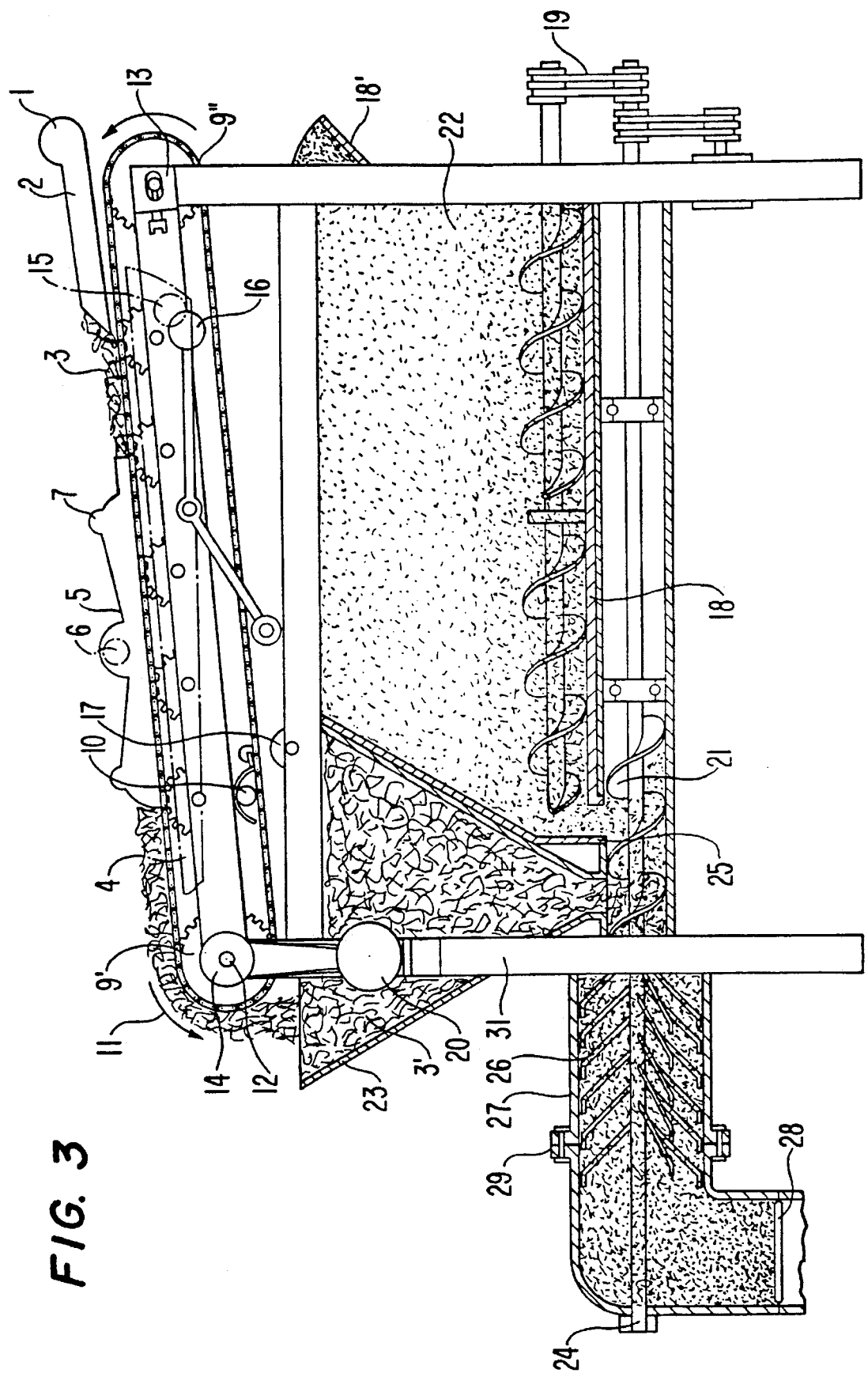
FIG. 3 is a longitudinal sectional view of the apparatus.
Figure 4:
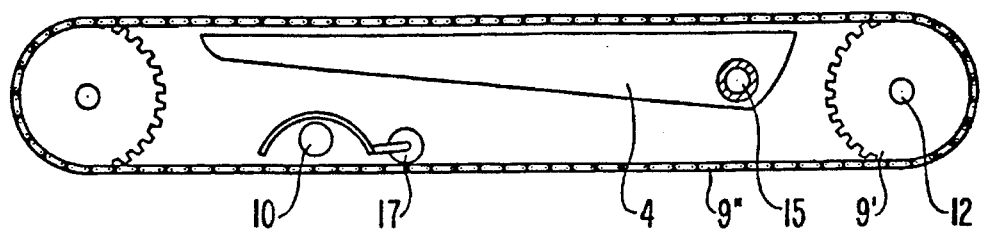
FIG. 4 is a side view of essential elements of the conveyor of the apparatus.

In this respect, referring particularly to FIG. 3, a second hopper 18 is supported by the framework 31 side-by-side with respect to the first hopper 23 in order to accommodate material to be added to the solid content 3' of the waste material received in the first hopper 23. The material to be added, designated by reference numeral 22, can be introduced into the second hopper 18 through an appropriate inlet 18'. A mixing chamber 27 communicates with the first 23 and second 18 hoppers so as to receive therein both the solid content 3' of the waste material and the material 22 to be added to the solid content. The mixing chamber 27 includes a mixing portion in which a mixer is disposed, and a receiving portion which extends beneath and is open to the hoppers 18, 23, reference numeral 25 designating an outlet of the hopper 18 open to the receiving portion of the mixing chamber 27. In the present embodiment, the mixer includes a rotary shaft 24 extending axially through the mixing chamber 27, a thread 21 on one portion of the rotary shaft 24 which is located in the receiving portion of the mixing chamber 27 (so as to constitute a screw conveyor), and mixing bars 26 extending from a portion of the rotary shaft 24 located in the mixing portion of a mixing chamber 27. The screw conveyor formed by the thread 21 and associated portion of the rotary shaft 24 conveys materials received from the hoppers 18, 23 to the mixing portion of the mixing chamber 27 when the rotary shaft is rotated by a motor (unnumbered in FIGS. 1B and 2) connected to the rotary shafts via belts 19 and pulleys. As is also shown in FIG. 3, a screw conveyor is located at the bottom of the hopper 18 and is also driven by the motor, which rotates rotary shaft 24, to feed the material 22 to the outlet 25 of the hopper 18 where it falls into the receiving portion of the mixing chamber 27.

The mixing bars 26 extend obliquely from the rotary shaft 24 in a direction away from the receiving portion of the mixing chamber 27, i.e. in a forward direction of conveyance. Upon rotation of the rotary shaft 24, these mixing bars 26 not only stir and mix together the materials conveyed into the mixing portion of the mixing chamber by the threaded portion of the rotary shaft but also further convey the materials toward an outlet of the mixing chamber 27. At the outlet of the mixing chamber 27 is disposed a gate 28 which is controllable by an off/on switch to open and close the mixing chamber in conjunction, the switch also controlling the rotation of shaft 24. Reference numeral 29 designates a flanged connection by which the outlet of the mixing chamber 27 can be removed to facilitate cleaning, maintenance, etc. of the apparatus. Incidentally, reference numeral 30 shown in FIG. 2 designates longitudinal bars which can provided as supported by the framework 31 in order to guide and support the upper and lower runs of the filter 9.

The apparatus so far described is capable of filtering the animal excrement (or other waste material), collecting the liquid content of the excrement in the receptacle 4 disposed beneath the upper run of the filter 9, and mixing the solid content 3' of the excrement with other desired materials 22. The apparatus of the present invention carries out further treatment of these materials as will now be described with reference to FIGS. 5–8. These figures show waste treatment tanks of the present invention.

Figure 5:
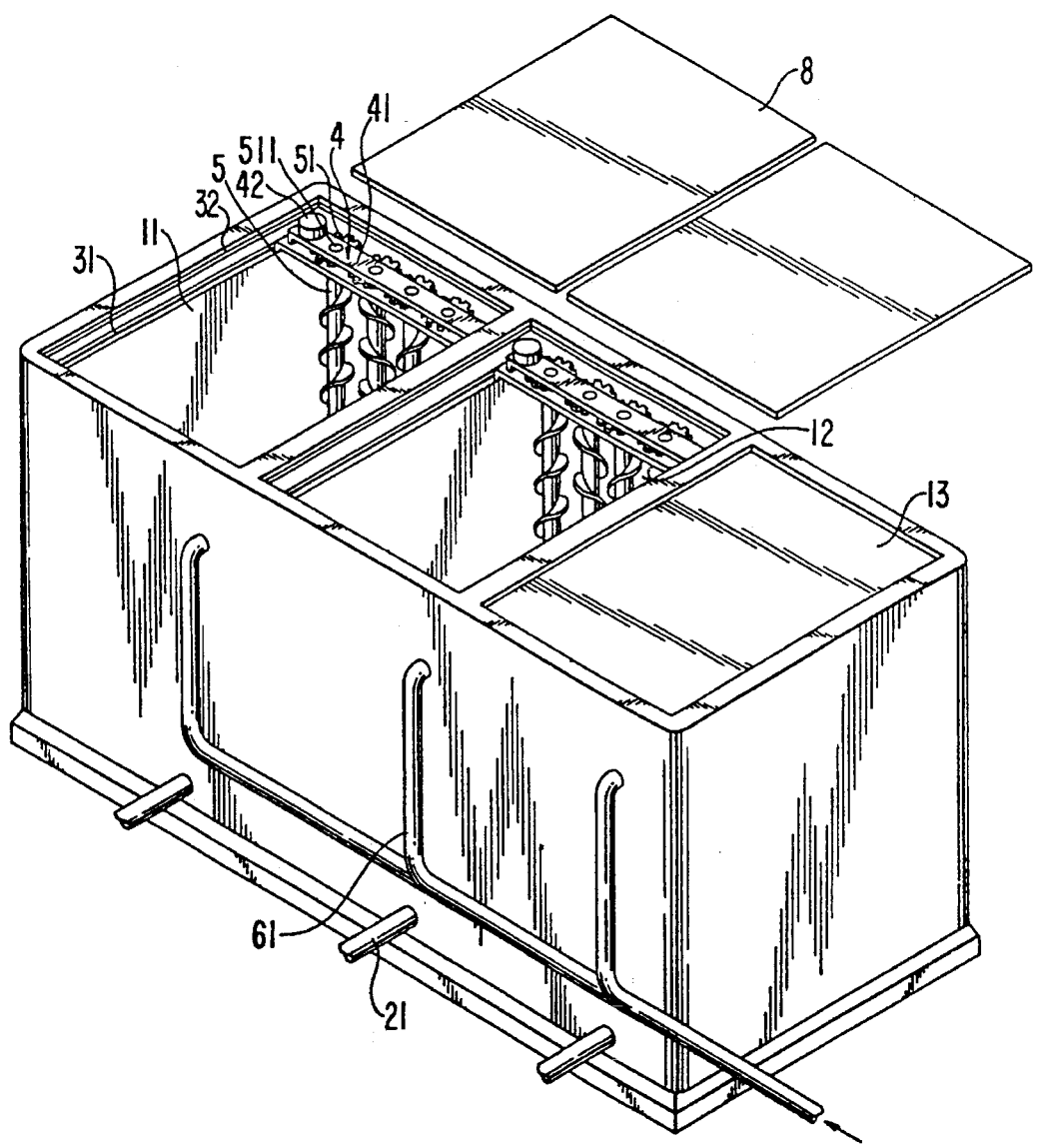
FIG. 5 is a perspective view of a waste treatment tank according to the present invention.
Figure 6A:
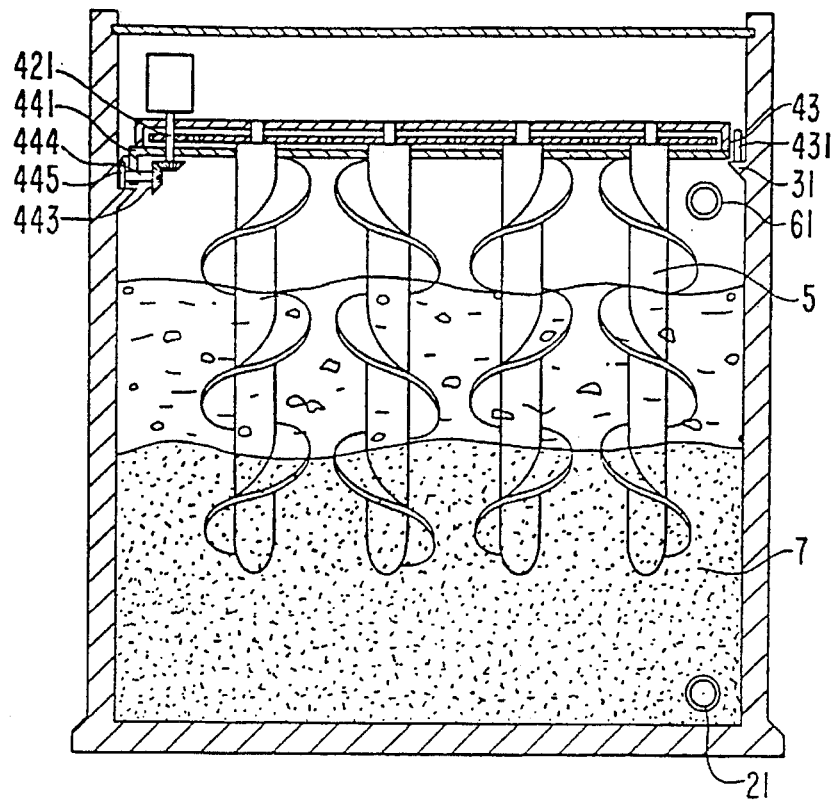
FIG. 6A is an elevation view, partly in section, of a waste treatment tank used to treat a mixture of solid materials produced in the apparatus of FIGS. 1A–4.
Figure 6B:
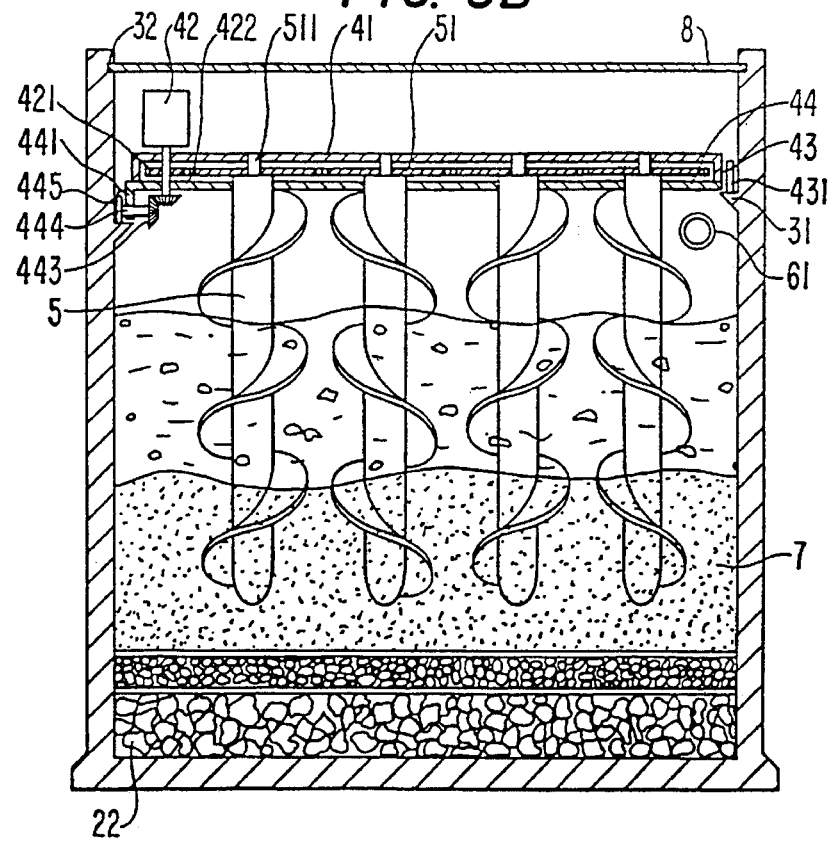
FIG. 6B is an elevation view, partly in section, of a waste treatment tank for treating the liquid filtrate of the waste material obtained from the apparatus shown in FIGS. 1A–4.
Figure 7:
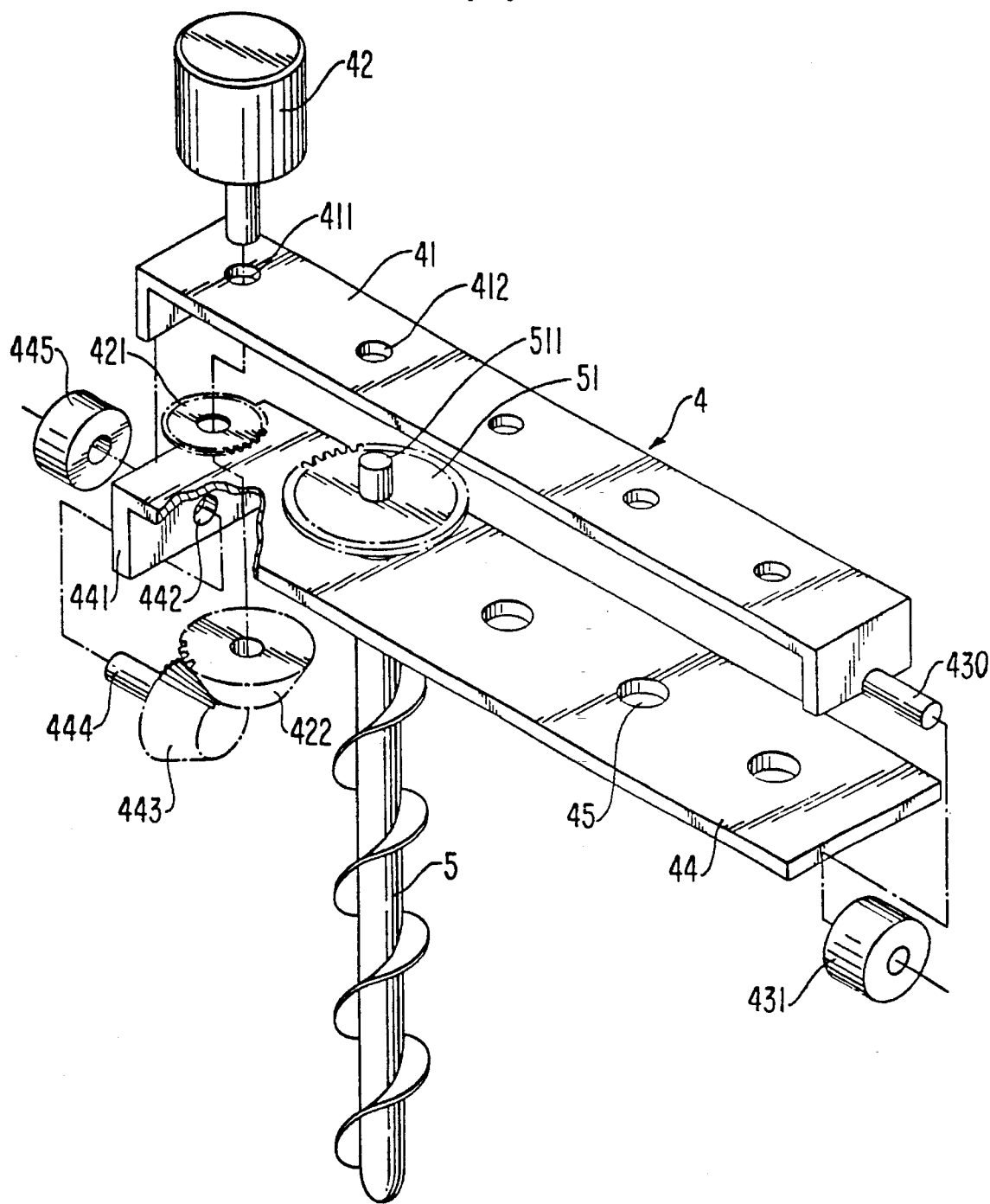
FIG. 7 is an exploded view of the motor-driven carriage of the waste treatment tank of the present invention showing one of the stirring bars rotatably supported thereby.
Figure 8:
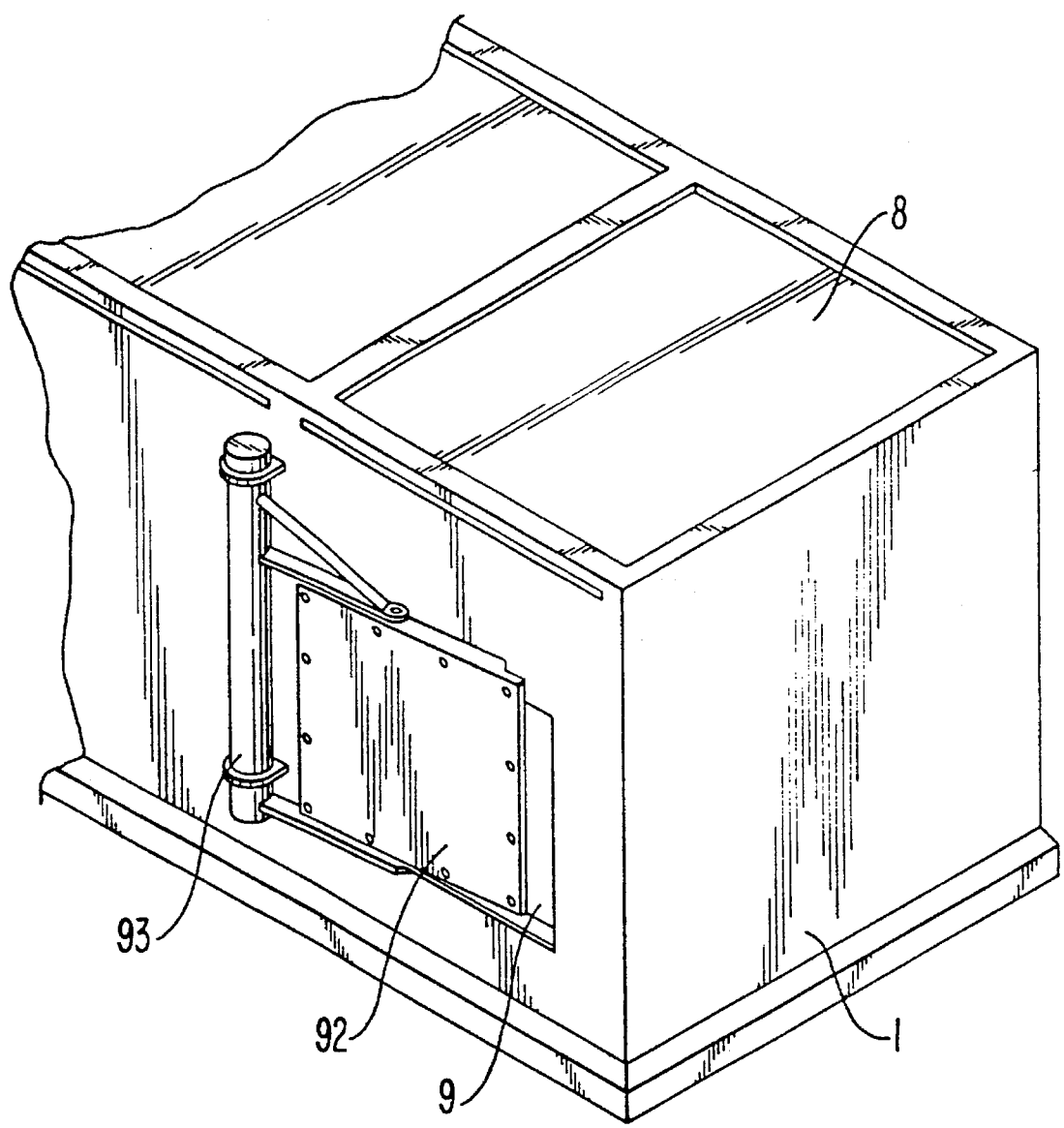
FIG. 8 is a perspective view of a portion of the waste treatment tank having a door by which the fertilizer or manure is removed.

First, treatment of the liquid content of the waste discharged from the liquid-collection receptacle 4 through piping 15 will be described with reference to FIGS. 5 and 6B. The waste treatment tank 100 includes at least one tank body, and in this embodiment, three tank bodies 110, 120 and 130, and covers 80 fitted in grooves 32 in the tank body. The covers can thus be slid to open or close the tops of the tank bodies.

The piping 15 from the liquid-collection receptacle 4 opens into the tank bodies 110, 120 and 130 via respective branch pipes 61. A filtration layer is disposed at the bottom of each tank body and extends up to a level below the location at which the piping (branch pipe 61) opens into the tank body. The filtration layer includes a bottom layer 220 of coarse aggregate, a first filtration net 250 disposed over the aggregate 220, a fine aggregate 230 of particles smaller than those of the coarse aggregate 220 disposed over the first filtration net 250, and a second filtration net 240 disposed over the fine aggregate 230. The bottom of the tank body on which the filtration layer is disposed may be inclined to one side of the tank body in order to aid in the discharge of the treated liquid through outlet pipes 210.

A motor-driven carriage 400 is disposed in each tank body at a level above the location at which the piping 61 open into the tank body.

The motor-driven carriage includes a carriage body 410 on which stirring bars 50 are rotatably supported, a motor 420 mounted to the carriage body 410, a driven member in the form of a wheel 445 which propels the carriage body across the tank body along a guide 310 in the form of rails or track, and gearing which connects the motor 420 to the driven member 445 and to the stirring bars 50 such that the output of the motor 420 is used to both drive the driven member 445 and rotate the stirring bars 50 relative to the carriage.

More specifically, the carriage body 410 is a casing comprising a top member 439 having an inversely U-shaped cross section, and a bottom member 440 having an L-shaped cross section. The motor 420 has an output shaft which extends through a hole 411 in the top member 439 and through an aligned hole in the bottom member 440. Shafts of the stirring bars 50 extend through large-diameter holes 450 in the bottom member 440 while journals 511 integral and coaxial with the shafts of the stirring bars 50 are received in small-diameter holes 412 in the top member 439.

A pinion 421 is mounted to the output shaft of the motor 420 within the casing. A set of meshing gears 51 are fixed to the shafts of the stirring bars 50, and these meshing gears 51 also mesh with the pinion 421. Accordingly, the motor 420 rotates the stirring bars 50 via the pinion 421 and the set of meshing gears 51.

The gearing also includes a set of bevel gears 422,443, one of which (422) is mounted to the output shaft of the motor 420. The other bevel gear 443 has a shaft 444 which extends through a hole 442 in a leg 441 of the bottom member 440. The wheel 445 is fixed to the shaft 444 of the bevel gear 443 such that the wheel 445 is rotatably supported by the leg 441 of the bottom member 440.

Another wheel 431 is rotatably supported by a shaft 430 integral with a leg of the top member 439. Thus, when the motor 420 is operated, the bevel gears 422, 443 are driven thereby rotating the wheel 445 whereby the carriage body 410 is driven along the rails 310 by the wheels 445, 431. Concurrently with the movement of the motor-driven carriage across the tank body, the stirring bars 50 are rotated such that the liquid contents of the waste within a tank are thoroughly mixed with soil (earthen material) 70 provided in the tank. The motor 420 is preferably of a reversible type and suitable limit switches (not shown) are provided at the ends of the tank body. The motor 420 can be operatively connected to these limit switches such that when the motor-driven carriage body arrives at an end of the tank body it contacts the limit switch whereupon the motor is driven in the reverse direction and the carriage body 410 is driven back across the tank body in conjunction with a counterrotation of the stirring bars 50. Any liquid flowing to the bottom of the tank is filtered by the filtration layer at the bottom of the tank so that only a liquid which is substantially harmless to the environment will be discharged from the outlet pipes 210.

It should be appreciated that once the soil 70 is added to the tank body and the cover 80 is slid along grooves 32 in the tank body, the entire operation of mixing the soil with the liquid contents of the waste can be carried out in an automated manner in an air-tight environment whereby the operation is rather sanitary. Of course, it will be readily appreciated that by providing appropriate valves for the piping leading into the waste treatment tank and the outlet pipes 210 as well as a suitable fluid level detector 62 of a known type, the entire process beginning with the introduction of the liquid contents of the waste material into the tank body (to a suitable level as detected by such a detector 62) can be automated. Further, the individual tank bodies of the tank 60 can be operated independently from one another as circumstances dictate. The stirring and filtration processes which occur in each tank body will be generally carried out for several days until a high quality and economic fertilizer is produced. At the end of an appropriate time the fertilizer can be removed through an opening 99 (FIG. 8) in the tank body covered by a door 92. The door is pivotably supported on the tank by a hinge mechanism 93 which normally keeps the door in position over the opening 99.

Finally, it should also be noted that instead of storing the organic manure formed from a mixture of the dry contents 3' of the animal waste and other materials such as dry dung which have been fed into the second hopper 18, the mixture can be further treated in a tank identical to that described above with respect to FIGS. 5 and 6B with the exception that no filtration layer is provided. Such a tank for treating the dry materials is shown in FIG. 6A. Because the elements of the tank shown in FIG. 6A are identical to those of the tank for treating the liquid content of the waste material, a description of like elements designated by like reference numerals will be omitted. Needless to say, the dry materials can also be mixed with a quantity of soil 70 and kept in the waste treatment tank for a period of 30 days or so whereby a high quality organic-based sterile manure is formed.

The advantages of the present invention reside in the ability of the apparatus to quickly separate the animal excrement into its mostly liquid and dry solid contents, to thoroughly mix the dry contents with the materials necessary to form a high quality organic-based manure, and to subsequently treat the liquid content of the animal excrement and the above-mentioned mixture in an air-tight sanitary environment. However, although the present invention has been described in detail above, various modifications and other advantages of the present invention will become quite apparent to those skilled in the art reviewing the present specification. All such modifications are seen to be within the true spirit and scope of the invention as defined in the appended claims.

What is claimed is:

1. Apparatus for composting waste material having solid and liquid contents, said apparatus comprising:
   a framework;
   an endless conveyor supported by said framework, said endless conveyor including a filter of flexible material in the form of an endless loop having upper and lower runs;
   a liquid-collection receptacle interposed between said upper and said lower runs of the filter so as to collect liquid filtrate from waste material conveyed along the upper run of the filter;
   a first hopper located beneath one end of said endless loop at a transition between said upper and said lower runs of the filter so as to collect solid content of the waste material conveyed along the upper run of said filter;
   a second hopper for accommodating material to be added to the solid content of the waste material;
   a mixing chamber communicating with said first and said second hoppers so as to receive therein both the solid content of the waste material and the material to be added to the solid content; and
   a mixer disposed in said mixing chamber so as to mix the materials received in the mixing chamber from said first and said second hoppers.

2. Apparatus for composting waste as claimed in claim 1, and further comprising a cover disposed over and covering an intermediate portion of the upper run of said filter, a blower located within said cover above the upper run of said filter so as to direct an air stream onto the waste material conveyed along the upper run of said filter beneath said cover, and an absorber located within said cover above the upper run of said filter so as to absorb liquid at the upper surface of the waste material.

3. Apparatus for composting waste as claimed in claim 1, wherein said endless conveyor further includes a drive roller and an idle roller about which said filter is wrapped, a pair of ropes each in the form of an endless loop and located to respective sides of said filter, a series of connectors connecting each of said ropes to said filter, and a plurality of toothed wheels rotatably supported by said framework and located between said filter and each of said ropes, said toothed wheels engaging said series of connectors.

4. Apparatus for composting waste as claimed in claim 1, wherein said first and said second hoppers are supported side-by-side by said framework, said mixing chamber includes a receiving portion extending beneath and open to said hoppers, and a mixing portion, and said mixer includes a rotary shaft extending axially through said mixing chamber, a thread on one portion of said rotary shaft located in said receiving portion so that materials received in said receiving portion are conveyed from said hoppers to said mixing portion when said rotary shaft is rotated, and mixing bars extending from another portion of said rotary shaft located in the mixing portion of said mixing chamber so as to stir and mix together materials conveyed into said mixing portion by the threaded portion of said rotary shaft, said mixing bars extending obliquely from said rotary shaft in a direction away from the receiving portion of said mixing chamber.

5. Apparatus for composting waste as claimed in claim 1, and further comprising a blower located between said upper and said lower runs of the filter directly above said first hopper, said blower being oriented to direct an airstream onto said lower run so as to clean said lower run of waste material adhering thereto.

6. Apparatus for composting waste as claimed in claim 5, and further comprising a pair of rolls adjacent said blower, the lower run of said filter located between and retained to travel at a position close to said blower by said rolls.

7. Apparatus for composting waste as claimed in claim 1, wherein said endless conveyor further includes a tension maintaining device including an arm pivotably mounted to said framework at a location intermediate opposite ends of said arm, a roller rotatably supported on one end of said arm, said roller disposed in contact with the lower run of said filter, and a weight mounted to the other end of said arm and biasing said roller against the lower run of said filter so that said tension maintaining device tensions said filter of flexible material.

8. Apparatus for composting waste as claimed in claim 7, wherein said endless conveyor further includes a drive roller and an idle roller about which said filter is wrapped, a tension adjusting device including a housing rotatably supporting one of said rollers of the endless conveyor, and means for adjusting the position of said one of the rollers relative to said housing such that the tension of the filter wrapped around said rollers of the conveyor is adjustable.

9. Apparatus for composting waste as claimed in claim 1, and further comprising a waste water treatment tank, and piping extending between and connected to said liquid-collection receptacle and said waste water treatment tank so as to deliver the liquid filtrate to said waste water treatment tank, said waste water treatment tank including a tank body, a filtration layer at the bottom of said tank body and extending up to a level below a location at which said piping opens into said tank body, a motor-driven carriage disposed in said tank body at a level above said location at which said piping opens into said tank body, a plurality of stirring bars supported by said carriage and extending toward the filtration layer at the bottom of said tank body, a guide which guides said motor-driven carriage between opposite ends of said tank body, and an outlet open to the tank body at the bottom thereof where said filtration layer is disposed.

10. Apparatus for composting waste as claimed in claim 9, wherein said filtration layer includes a bottom layer of coarse aggregate, a first filtration net disposed over said coarse aggregate, a fine aggregate of particles smaller than those of said coarse aggregate and disposed over said first filtration net, and a second filtration net disposed over said fine aggregate.

11. Apparatus for composting waste as claimed in claim 9, wherein said motor-driven carriage includes a carriage body on which said stirring bars are rotatably supported, a motor mounted to said carriage body, a driven member which propels said carriage body across said tank body, and gearing connecting said motor to said driven member and to said stirring bars such that output of said motor is used to both drive said driven member and rotate said stirring bars relative to said carriage body.

12. Apparatus for composting waste as claimed in claim 11, wherein each of said stirring bars comprises a rotary shaft, and a thread extending helically along said shaft.

13. Apparatus for composting waste as claimed in claim 1, and further comprising a solid waste treatment tank connected to said mixing chamber so as to receive the material mixed therein, said solid waste treatment tank including a tank body, a motor-driven carriage disposed in each said tank body, a plurality of stirring bars supported by said carriage and extending toward the bottom of said tank body, and a guide which guides said motor-driven carriage between opposite ends of said tank body.

14. Apparatus for composting waste as claimed in claim 13, wherein said motor-driven carriage includes a carriage body on which said stirring bars are rotatably supported, a motor mounted to said carriage body, a driven member which propels said carriage body across said tank body, and gearing connecting said motor to said driven member and to said stirring bars such that output of said motor is used to both drive said driven member and rotate said stirring bars relative to said carriage body.

15. Apparatus for composting waste as claimed in claim 14, wherein each of said stirring bars comprises a rotary shaft, and a thread extending helically along said shaft.

16. A waste treatment tank comprising: at least one tank body, a motor-driven carriage disposed in each said tank body, a plurality of stirring bars rotatably supported by said carriage and extending therefrom toward the bottom of the tank body, and a guide which guides said motor-driven carriage between opposite ends of said tank body, said motor-driven carriage including a carriage body on which said stirring bars are rotatably supported, a motor mounted to said carriage body, a driven member which propels said carriage body across said tank body, gearing connecting said motor to said driven member and to said stirring bars such that output of said motor is used to both drive said driven member and rotate said stirring bars relative to said carriage body, and a filtration layer at the bottom of each said tank body, said filtration layer including a bottom layer of coarse aggregate, a first filtration net disposed over said coarse aggregate, a fine aggregate of particles smaller than those of said coarse aggregate and disposed over said first filtration net, and a second filtration net disposed over said fine aggregate.

17. A waste treatment tank comprising: a tank body, a motor-driven carriage disposed in said tank body, a plurality of stirring bars rotatably supported by said carriage and extending therefrom toward the bottom of the tank body, each of said stirring bars comprising a rotary shaft and a thread extending helically along said shaft, and a guide which guides said motor-driven carriage between opposite ends of said tank body, said motor-driven carriage including a casing on which said stirring bars are rotatably supported, a motor mounted to said casing, a wheel which is rotatably supported by said casing and propels said casing across said tank body, and gearing connecting said motor to said driven member and to said stirring bars such that output of said motor is used to both drive said wheel and rotate said stirring bars relative to said carriage body, said stirring bars having parallel shafts rotatably supported by said casing, and said gearing comprising a set of bevel gears one of which bevel gears is mounted to an output shaft of the motor and the other of which bevel gears is connected to said wheel, a pinion mounted to the output shaft of said motor and disposed within said casing, and a set of meshing gears fixed to said shafts of said stirring bars, one of said meshing gears also meshing with said pinion.

18. A waste treatment tank as claimed in claim 17, and further comprising a filtration layer at the bottom of the tank body, said filtration layer including a bottom layer of coarse aggregate, a first filtration net disposed over said coarse aggregate, a fine aggregate of particles smaller than those of said coarse aggregate and disposed over said first filtration net, and a second filtration net disposed over said fine aggregate.

* * * * *